US010751591B2

(12) United States Patent
Garcia Tolosa

(10) Patent No.: US 10,751,591 B2
(45) Date of Patent: Aug. 25, 2020

(54) PIÑATA INTERACTION DEVICE, SYSTEM, AND METHOD

(71) Applicant: Rodolfo Garcia Tolosa, Ensenada (MX)

(72) Inventor: Rodolfo Garcia Tolosa, Ensenada (MX)

( * ) Notice: Subject to any disclaimer, the term of this patent is extended or adjusted under 35 U.S.C. 154(b) by 112 days.

(21) Appl. No.: 16/110,986

(22) Filed: Aug. 23, 2018

(65) Prior Publication Data
US 2020/0061431 A1    Feb. 27, 2020

(51) Int. Cl.
*A63B 67/10* (2006.01)
*A63H 5/00* (2006.01)
*G06F 3/16* (2006.01)
*G06F 3/01* (2006.01)
*G01P 1/12* (2006.01)

(52) U.S. Cl.
CPC ............. *A63B 67/10* (2013.01); *A63H 5/00* (2013.01); *G01P 1/127* (2013.01); *G06F 3/01* (2013.01); *G06F 3/167* (2013.01); *A63H 2200/00* (2013.01)

(58) Field of Classification Search
None
See application file for complete search history.

(56) References Cited

U.S. PATENT DOCUMENTS

| | | | | |
|---|---|---|---|---|
| 7,006,001 B2 * | 2/2006 | Estrada | ................. | A63H 5/00 340/384.3 |
| 8,678,872 B1 * | 3/2014 | Valencia | ................. | A63H 33/00 446/5 |
| 2003/0190858 A1 * | 10/2003 | Thomas | ................. | A63H 3/28 446/484 |

* cited by examiner

*Primary Examiner* — James S. McClellan
*Assistant Examiner* — Peter J Iannuzzi
(74) *Attorney, Agent, or Firm* — Enrique A. Monteagudo, Esq.

(57) ABSTRACT

Aspects of the present disclosure generally pertain to a piñata interaction device, system, and method. Aspects of the present disclosure more specifically are directed toward an electronic device for a piñata that includes a housing, a power supply, a speaker, an impact sensor, an user interface, and a controller module configured to store a plurality of piñata communications to emit at least one of the plurality of piñata communications in response to the piñata being hit. The electronic device is removably coupleable with at least one of the piñata and the hitting stick. The electronic device may be reconfigured to output customized responses or from a wide library of audio is stored which can be selected from music, voice, instructions or sounds of various kinds. The electronic device may interact with third party devices via hosted application.

18 Claims, 13 Drawing Sheets

FIG 6C  FIG 6D

PIÑATA INTERACTION DEVICE, SYSTEM, AND METHOD

BACKGROUND

Technical Field

The present disclosure generally pertains to piñatas, and is more particularly directed towards an electronic device for a piñata.

Related Art

The piñata is an old tradition in Mexican parties like birthdays, anniversaries, posadas (several gatherings before Christmas day), and other festivities. Its origin is the fusion between prehispanic cultures and Europeans. Today, the use of the piñatas in special events has a relevant place making the parties and gatherings funner and an excuse to give away candies, fruits, toys and other articles, which brings joy to both kids and adults. There are different sizes, shapes, colors and materials such as clay, paperboard, and others. In the present, the shape of the piñata has been replaced from clay to paperboard, newspaper harden by glue and other additives. This has made possible the versatility of the designs.

U.S. Pat. No. 7,006,001 to Estrada, et al. dated Feb. 28, 2006, shows a speech-emitting celebration device. The speech or phrase emitting celebration device, in the nature of a piñata, includes a longitudinal axial channel within which is placed a complementally sized integrated circuit ("IC") including a library of pre-programmed voice chips having phrases selected by random. The circuit is responsive to impacts or shocks upon a fanciful housing of the device sufficient to actuate a shock sensor switch thereof. A speaker, in electrical communication with the circuit board of the integrated circuit, is in mechanical communication with a speaker at an end of the channel so that the emitted phrase may be heard by those in the vicinity of the device. A hollow cylindrical sensor may be disposed within the interior channel to provide appropriate input to the shock sensor switch, or a more sensitive discrete element sensor may be used.

While many people know how to use a piñata, there are many times people don't, particularly if it is not part of their culture. For example, one of the problems is that some people don't know the general order of operation or "default rules", such as timing allowed per person, or spinning the "hitter" depending on age/skill. This can cause stress when one is surrounded by many screaming and excited children. Another problem is letting the excited, blindfolded, and sometimes dizzy hitter know when to start, particularly among many familiar voices. Another problem is that "first timers" may not know some of the variations or optional rules (e.g., ordering hitters from youngest to oldest, opting out of blindfold for youngest kids, reducing hitting time & vigorous spinning for older teens, and so forth). Another problem may be that those not familiar might not know traditional saying or songs such as: "Dale! dale!" (a traditional children's' song). All of this might not interfere with the basic act of striking the piñata, but together having familiarity may help make the party more fun, interactive, safe, and orderly.

The present disclosure is directed toward overcoming known problems and problems discovered by the inventor.

SUMMARY OF THE DISCLOSURE

Aspects of the present disclosure generally pertain to a piñata interaction device, system, and method. Aspects of the present disclosure more specifically are directed toward an electronic device for a piñata that includes a housing, a power supply, a speaker, an impact sensor, an user interface, and a controller module configured to store a plurality of piñata communications to emit at least one of the plurality of piñata communications in response to the piñata being hit. The electronic device is removably coupleable with at least one of the piñata and the hitting stick. The electronic device may be reconfigured to output customized responses or from a wide library of audio is stored which can be selected from music, voice, instructions or sounds of various kinds. The electronic device may interact with third party devices via hosted application.

An electronic device for a piñata is disclosed herein. The electronic device includes a housing configured to removably attach to the piñata, the housing having an insertion profile and being at least partially insertable into the interior cavity of the piñata via the insertion profile, the housing including an interior retainer and an exterior retainer, said interior retainer configured to inhibit the housing from being removed from the piñata when attached to the piñata, said exterior retainer configured to inhibit the housing from traveling further into the interior cavity of the piñata when attached to the piñata; a power supply affixed to the housing and configured to power the electronic device; a speaker affixed to the housing and arranged to face away from the piñata when the housing is attached to the piñata; an impact sensor affixed to the to the housing, the impact sensor configured to sense an impact to the piñata, and to communicate an impact signal; a controller module affixed to the housing, the controller module including a memory module, a communication module, and a processor module, the memory module configured to persistently store a plurality of piñata communications, the processor module configured to receive the impact signal from the impact sensor, to select at least one of the plurality of piñata communications from the memory module, and to command the speaker to emit at least one of the plurality of piñata communications in response to receiving the impact signal; and an user interface configured to communicate with the communication module and to operate the electronic device by a user.

According to one embodiment, system for interaction with a piñata via a mobile device is disclosed herein. The system for interaction with a piñata via a mobile device includes an electronic device for a piñata as above, an application installed on or otherwise accessible by the mobile device, and an user interface configured to communicate with the communication module and to operate the electronic device by a user, the user interface including a first set of controls accessible by the mobile device via the application, and a second set of controls fixed to the housing of the electronic device, the first set of controls communicably coupled with the processor via the wireless communication radio.

According to another embodiment, a method for interaction with a piñata is disclosed herein. The method includes the steps of providing an electronic device for a piñata as above, attaching the electronic device to the piñata such that a portion of the electronic device is within the interior cavity of the piñata and another portion of the electronic device is outside the interior cavity and extends beyond the exterior of the piñata, and communicating a plurality of piñata communications via the speaker in response to the piñata being hit.

BRIEF DESCRIPTION OF THE DRAWINGS

FIGS. 6A-6E are various views of the electronic device of FIGS. 4A-4D, according to one embodiment of the present disclosure.

DETAILED DESCRIPTION

Figure 1:
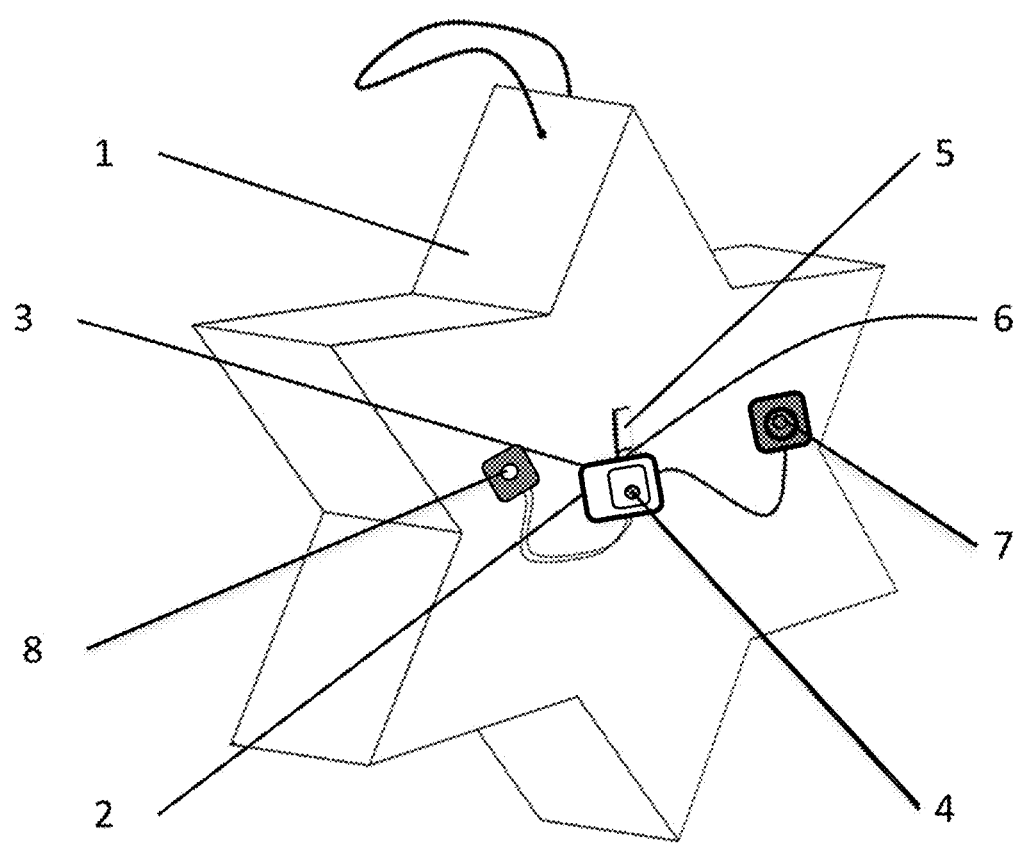
FIG. 1 is a schematic diagram of a piñata body to which the electronic device has been incorporated, according to one embodiment of the present disclosure.

Aspects of the present disclosure generally pertain to a device that facilitates a user to interact with a piñata. One object is to make an interactive piñata that stimulates the audience to keep playing. Another object is to allow this interactive piñata to be adapted to piñatas made in artisanal process, no matter its shape, design, and materials. It is also an object that this piñata brings more joy to the gatherings and parties, regardless the age of the attendants. Yet another object is to provide an electronic device that can be kept and reused after the celebration.

Generally, the piñata interaction device is a device that attaches to the piñata or the striker and communicates to nearby users. Aspects of the present disclosure also include the use of an interactive electronic device which consists in a micro-processor card and a USB port connected to a vibration sensor and a speaker. Once the piñata gets hit, it can make sounds or expressions of pain, laugh, motivation, challenge, and other predetermined phrases. A user can also add music, instructions or any type of audio. This interactive piñata has been developed in a way that is easy to build, functional and economic.

Aspects of the present disclosure may include an interactive piñata fitted to include an electronic device with a microprocessor that reads information from a USB memory and a vibration sensor. The microprocessor may be connected electronically to a speaker and it has an on/off switch. The body of the piñata can be built with different materials that can break easily while being hit by the player, which in turn activates the sensor producing different sounds. The USB port is used to receive a USB memory with vast files such as music, voice, instructions and other sounds that can be reproduced by the microprocessor randomly or in order. Such sensor can measure the different types of intensity while being hit and make the proper sound. For example, in case of being hit hard, the device will say "ouch", while if hit softer it can challenge the player to intensify the blow. An audio file can include Christmas songs, or the famous Spanish chanting when hitting the piñata "Dale, dale, dale", or it can give instructions, or any type of songs, even famous celebrity voices, or motivational phrases, laughs, pain expressions, etc. The interactive device is reusable, this means that after breaking the piñata it can be use in other piñatas. The speaker can be placed externally so everybody can clearly hear the sounds, expressions, songs, etc.

For a better understanding of the present disclosure, the follow detailed description of some of the embodiments thereof will be given, and shown in the appended drawings, which are for illustrative purposes, but are not limited to the following description. Accordingly, characteristic details of the piñata interaction device, system, and method are clearly shown in the following description and in the illustrative drawings which are attached, the same reference signs serving to indicate the same or similar parts.

The present disclosure relates to a piñata having an interactive electronic device including a micro-processor card and a USB port connected to a vibration sensor and a speaker. Once the piñata gets hit, it can make sounds or expressions of pain, laughter, motivation/encouragement, challenge, as well as other predetermined phrases. Through the USB port one can also add music, instructions, or any type of audio. Some of these elements have been applied successfully in the oil industry, seismic alarms, among others, such as skill games or interactive dolls. Therefore, this interactive piñata has been developed in a way that is easy to build, functional, and economical. Moreover benefits may include production with a diversity of materials, specifically with an electronic device that makes this product more appealing, and giving family reunions, holidays and parties a more fun outcome.

Briefly described and generally, the interactive piñata with integrated electronic system includes a piñata body adapted to receive an electronic device including an electronic card with a microprocessor and a vibration sensor. Said microprocessor is configured to read information from a USB memory that can be connected via a USB port. The microprocessor may be connected electronically to a speaker and may include an associated on/off switch. The microprocessor may be powered by a power supply.

The body of the piñata can be built with different materials that can break easily while being hit by the player, such as cardboard, clay, plastic or other material, which in turn activates the vibration sensor and produces the desired sounds. Said piñata body is adapted to receive the electronic device that may be housed in a housing to be fixed to the inner face or the outer face of the piñata body.

The USB port is adapted to receive a USB memory in which a wide library of music audios, voice, instructions or sounds of various types are stored and can be reproduced by the microprocessor randomly or in order.

Said vibration sensor can be calibrated to measure different degrees of vibration intensity, and based on it, reproduce a certain audio. For example, in case of being hit hard, the device will say "ouch", while if hit softer, it can challenge the player to intensify the blow.

When the vibration sensor detects a strong blow, the microprocessor can receive the signal and read an audio from the USB memory that manifests some sensation and that will be emitted through the loudspeaker that is the horn.

The audio library may include songs such as Christmas songs, piñata breaking songs (e.g., the famous "Dale, dale, dale" and "Another round"/"Otras rondas"). Likewise, the audio library may include voice instructions, festivities instruction, songs, voices of popular artists, voice commands/phrases, for example, of challenge, motivation, laughter, pain, etc.

As above, the electronic device may be embedded in a housing that is adapted to adhere to a part of the piñata body, for example, on its inner face or its outer face. In one preferred embodiments, the electronic device may be recoverable/reusable. That is to say when the piñata is destroyed said module can be recovered to be incorporated to another piñata body.

In a preferred embodiment, the speaker may be disposed on the outer face of the piñata (e.g., for the public to hear more clearly the emission of sounds, music or instructions).

The present disclosure has as an objective, to make available an interactive piñata with integrated electronic device that allows to emit sounds that stimulate the audience to continue playing. Another object is to allow this interactive piñata to be adapted to piñatas made in artisanal process or serial construction processes, no matter its shape, design, and materials. A further object is to enable said interactive piñata with integrated electronic device to better accommodate parties and gatherings for children and adults. Still another object is to make said electronic device recoverable after the celebration. A further aim of the disclosure is to make said interactive piñata without requiring high acquisition cost for its manufacture, assembly, and tooling, and all those qualities and objectives which will become apparent upon review of the present disclosure and drawings.

FIG. 1 shows a schematic diagram of an interactive piñata with integrated electronic system, according to one embodiment of the present disclosure. In particular, the interactive piñata with integrated electronic system may include a piñata body 1 adapted to receive an electronic device 2 including an electronic card 3 having at least one microprocessor (not shown) and a vibration sensor 4. The microprocessor may be configured to read information from a USB memory 5 connected via a USB connection port 6 connected to said microprocessor. The microprocessor may be further electronically connected to a speaker (loudspeaker 7), and include an on/off switch 8 there between. The microprocessor may be powered via a power supply 9. (FIG. 2A)

The piñata body 1 may be made of different materials such as cardboard, terra cota/earthenware, plastic or other materials that can break easily while being hit by the players (to activate the vibration sensor 4 and output a desired sound). The piñata body 1 may be adapted to receive the electronic device 2 which may be housed in a housing to be fixed to an inner face or an outer face of the piñata body 1.

Figure 2:
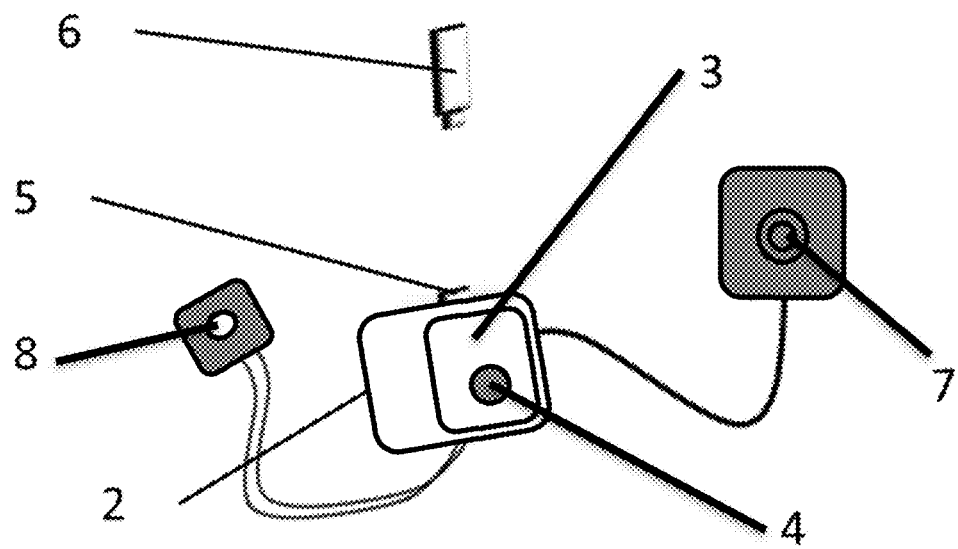
FIG. 2 is a schematic diagram of the electronic device of FIG. 1, illustrating the electronic board with a microprocessor, a vibration sensor, a USB connection port (where a USB memory may be connected), and a wired connection of the switch to the loudspeaker.
Figure 2A:
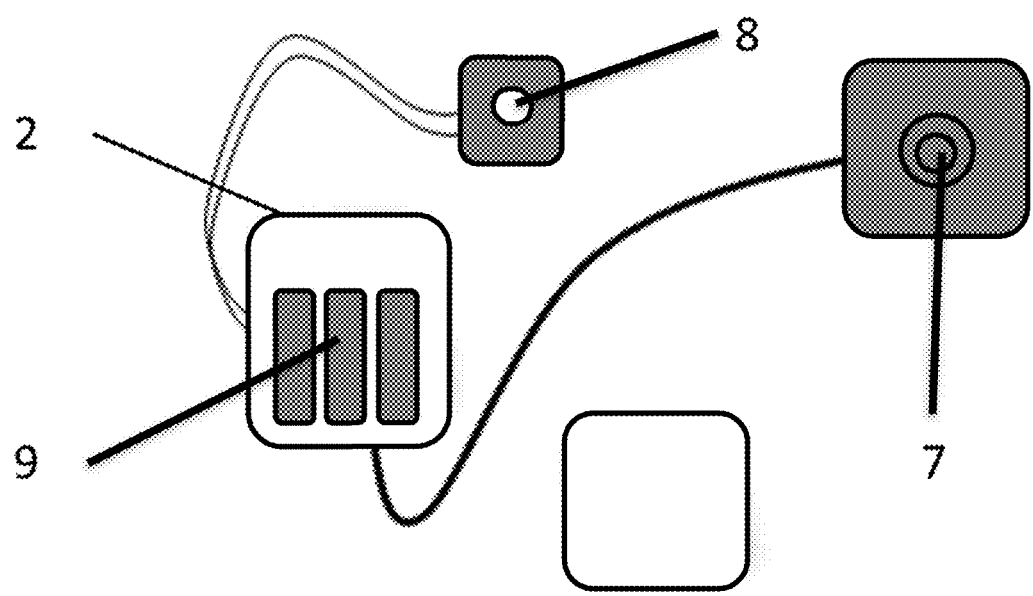
FIG. 2A is a schematic diagram of the electronic device of FIG. 1, illustrating a power supply and a wired connection of the switch to the loudspeaker, according to one embodiment of the present disclosure.

FIG. 2 shows a schematic diagram of the electronic device 2, illustrating the electronic card 3 with its microprocessor (not shown), the vibration sensor 4, the USB connection port 6 (where the USB memory 5 is plugged in), the wired connection of the on-and-off switch 8, which goes to the loudspeaker 7. As shown, the USB connection port 6 is adapted to receive the USB memory 5, which may be full of a wide audio library. Further, music, voice, instructions or sounds of various kinds in the audio library may be selected and reproduced by microprocessor command (e.g., at random or by a predetermined programming).

The vibration sensor 4 may be calibrated to measure different degrees of vibration intensity, and based on it reproduce a certain audio. When the vibration sensor 4 detects a strong blow, the microprocessor may receive a signal, and instruct the reading of the USB memory 5 of an audio indicating a sensation that will then be output through the loudspeaker 7. For example, in the case of strong hit, the loudspeaker 7 may emit sounds like "ouch", and in the case of weak hit, the loudspeaker 7 may challenge the player to hit harder.

The audio library may include holiday songs, piñata breaking songs (e.g., the famous "Dale, dale, dale", "another round", etc.), voice instructions, festivities instructions, songs, voices of popular artists, voice commands (e.g., of phrases of challenge, motivation, laughter, pain, etc.).

FIG. 2A shows a schematic diagram of the electronic device 2, illustrating the power supply 9, the wired connection of the on/off switch 8 to the loudspeaker 7, according to one embodiment of the present disclosure. As shown, in one preferred embodiment, the loudspeaker 7 may be disposed on the outer face of the piñata to more clearly hear its emitted sounds, music, or instructions. In addition, as already mentioned, between the microprocessor and the loudspeaker 7 there may be an on/off switch 8, for example, to beneficially avoid draining of the power supply 9 over time. Preferably the power supply 9 (e.g., rechargeable or non-rechargeable long life batteries) will be enclosed or otherwise secured with means to fix them in place.

As above, the electronic device 2 may be housed in an enclosure or other casing, which is adapted to adhere to a part of the piñata body 1 (e.g., on its inner face or its outer face). According to one embodiment, the electronic device 2 may be recoverable. For example, when the piñata body 1 is destroyed, the recoverable module (e.g., electronic device 2) may be recovered to be incorporated into another piñata body 1.

Figure 3:
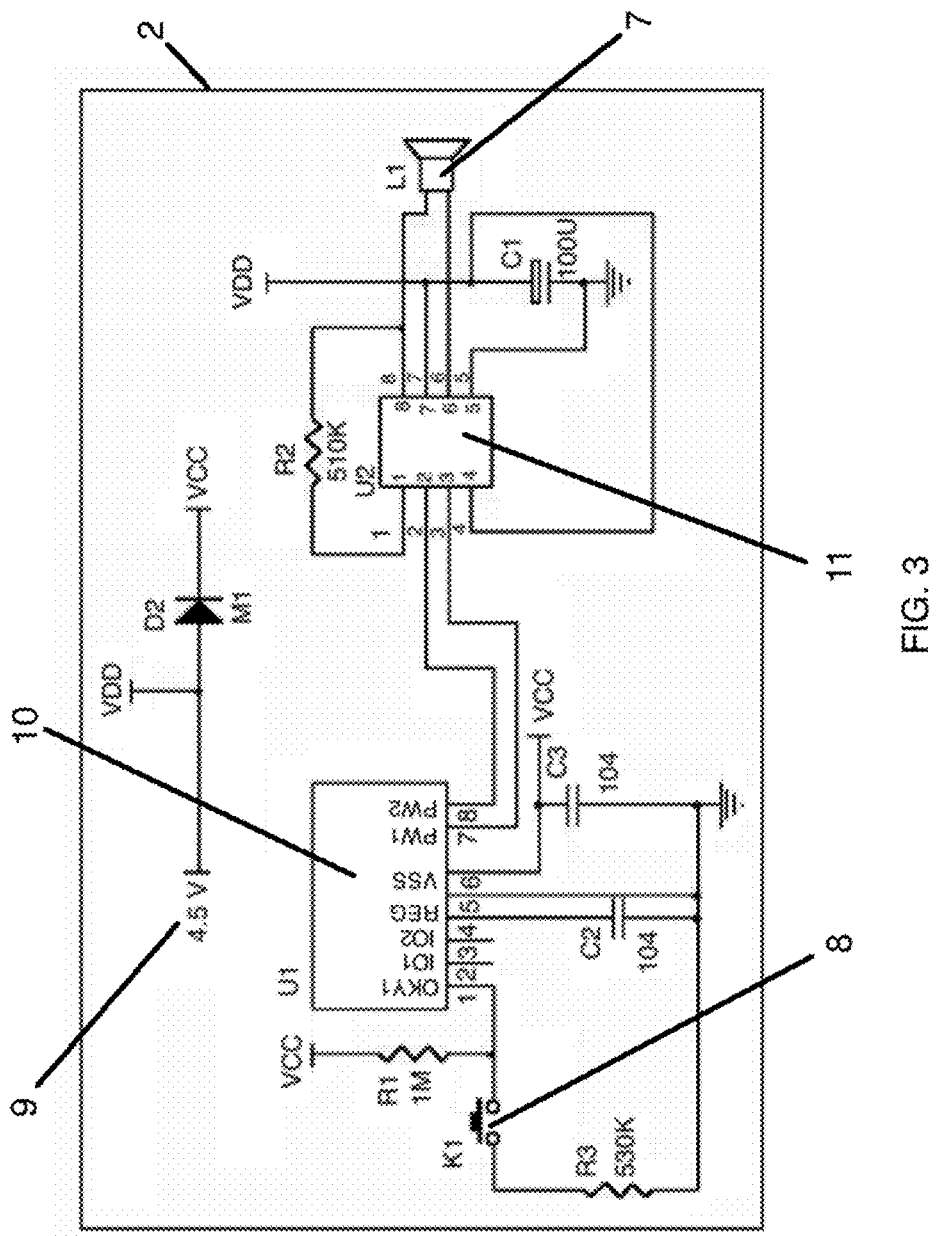
FIG. 3 is a schematic of the electronic card of the electronic device of FIG. 1, according to one embodiment of the present disclosure.

FIG. 3 shows a schematic of the electronic circuit of the electronic device 2 for interactive piñata with integrated electronic device, according to one embodiment of the present disclosure. As shown, the electronic device 2 may include at least microprocessor. For example, and as shown, the electronic device 2 may include an input microprocessor 10 and output microprocessor 11, Here, input microprocessor 10 may include a plurality of ports that are configured to receive information from by the vibration sensor 4. To illustrate, when the vibration sensor 5 detects a strong blow, the input microprocessor 10 may receive a signal and instruct the output microprocessor 11 to select from an audio library and play the music, voice, instructions or sounds of various kinds in response. These sounds may be played at random or by predetermined programming, and these played sounds may be output through the loudspeaker 7 to the general public. Further, when the on/off switch 8 is actuated (i.e., placed in the "off" position or "off" setting), the generated signal of the vibration sensor 4 may be turned off or otherwise interrupted from communicating to the input microprocessor 10. Thus, no warning is issued by the loudspeaker 7. Here, basic operating information of the power supply 9 is also shown.

FIGS. 4A-4D are various views of an electronic device for a piñata, according to an exemplary embodiment of the present disclosure. Here, an electronic device 100 is shown in an exemplary "in use" condition. Generally, the electronic device 100 is configured to removably attach to a piñata 10, such as by clipping on. For example, the electronic device 100 may be partially inserted into an aperture (e.g., opening 18 FIG. 7B) of the piñata 10 while in a first orientation, rotated or otherwise manipulated to a second orientation, and then clamped or otherwise coupled to a piñata wall 12, such that one portion of the electronic device 100 is inside an interior cavity 16 and another portion of the electronic device 100 is outside an exterior 14 of the piñata 10. Further, the electronic device 100 may be arranged such that its speaker(s) substantially covers the opening 18 of the piñata 10, e.g., greater than 50%. The electronic device 100 may be substantially similar to and/or include one or more of the elements and features of the electronic device 2 described above and shown in FIG. 3 for example.

Figure 5:
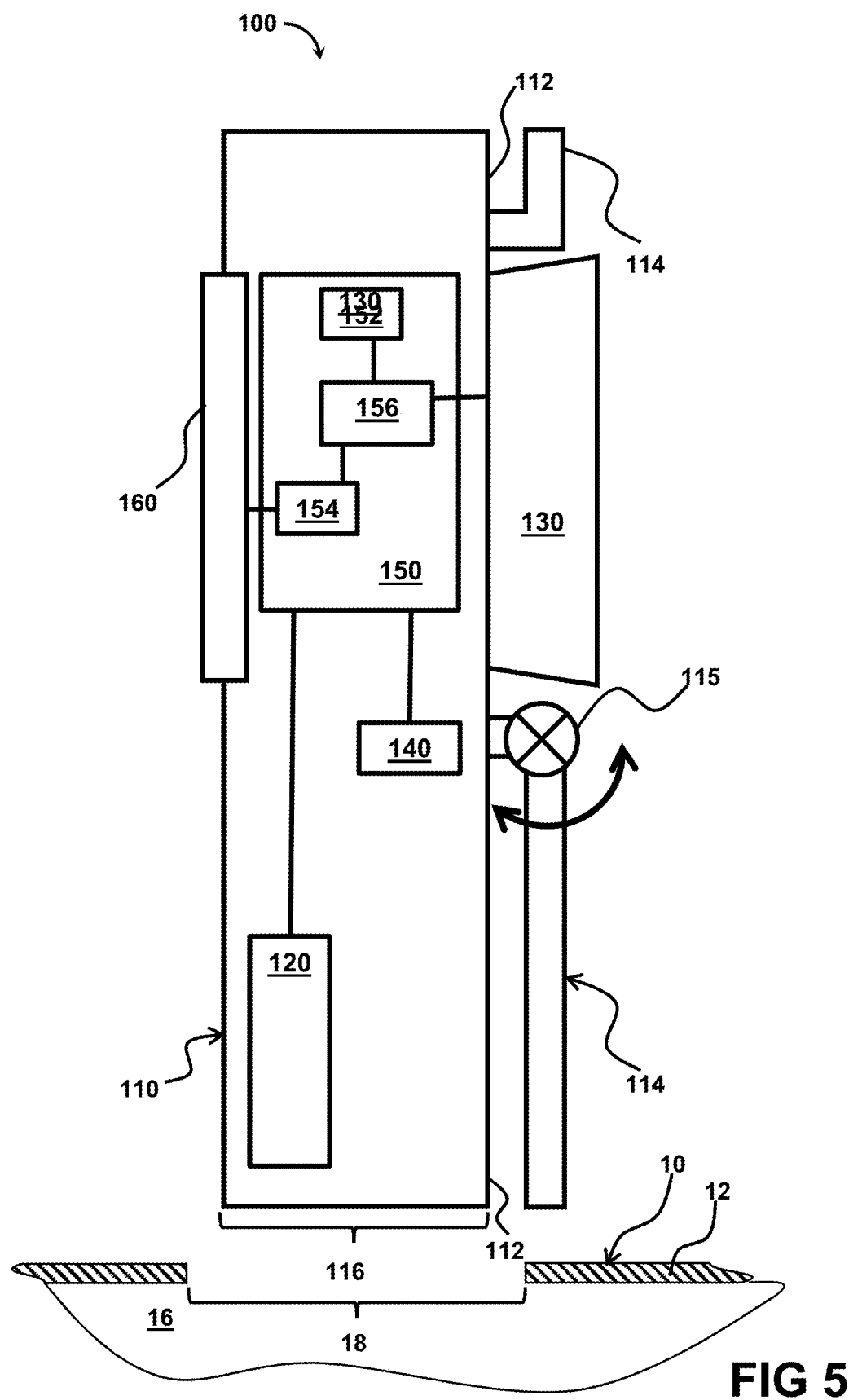
FIG. 5 is a schematic diagram of an electronic device for a piñata, according to an exemplary embodiment of the present disclosure.

FIG. 5 is a schematic diagram of an electronic device for a piñata, according to an exemplary embodiment of the present disclosure. As illustrated, the electronic device 100 may include a housing 110, a power supply 120, a speaker 130, an impact sensor 140, a controller module 150, and a user interface 160. The power supply 120, the speaker 130, the impact sensor 140, the controller module 150, and the user interface 160 may be encased by, integrated with, or otherwise affixed to the housing 110, for example, to form a single unit.

The housing 110 may have an insertion profile 116, and include an interior retainer 112 and an exterior retainer 114. As illustrated, the housing 110 is at least partially insertable through an aperture (opening 18) in the piñata wall 12 and into the interior cavity 16 of the piñata 10 via its insertion profile 116. It should be understood that the size and shape of the aperture may vary from piñata to piñata, and is frequently cut or otherwise made by a user just prior to filling the piñata. However, it is typically desirable to minimize the size of aperture to between 2 and 5 inches across its largest dimension, to better contain the candy or other piñata contents inside. Also, although, here, the insertion profile 116 is schematically represented as a linear dimension, it should be understood that the insertion profile 116 is physically planar. Further, the insertion profile 116 generally represents a simplified minimal profile or cross sectional shape (e.g., simple or complex) of the housing 110 during its insertion though the opening 18, relative to other profiles or cross sections of the housing 110, which are larger.

Generally, the interior retainer 112 is configured to inhibit the housing from being removed from the piñata 10, and the exterior retainer 114 is configured to couple to the exterior of the piñata 10 or otherwise inhibit the housing 110 from traveling into or further into the interior cavity 16 of the piñata 10, once attached to the piñata 10. The profile or other aspects/features of each of the interior retainer 112 and the exterior retainer 114 are generally larger than the aperture in at least one direction, particularly after rotation or other means of deployment of the interior retainer 112 and the exterior retainer 114, for example, once the electronic device 100 has been positioned/orientated for attachment to the piñata 10.

According to one embodiment, and as indicated, the interior retainer 112 may be embodied as or otherwise integrated with one or more portions of the housing 110 (e.g., an external surface of an encasing portion of the housing 110), while the exterior retainer 114 may be embodied as one or more legs, appendages, or extensions from the encasing portion of the housing 110. According another embodiment the interior retainer 112 and the exterior retainer 114 may be arranged to form opposing groves, with at least one having an additional insertion space, such that the piñata wall may be slid into one grove beyond a grabbing lip so as to insert an opposing portion of the piñata wall into the opposing grove (e.g., similar to installing a framed window screen into a window frame).

According to one embodiment, the exterior retainer 114 may include at least one member that is reconfigurable, or otherwise dynamic. For example, the exterior retainer 114 may include one fixed leg and one reconfigurable leg. According to one embodiment, the dynamic member of the exterior retainer 114 may include a spring hinge 115. The spring hinge 115 may be a portion or feature of the exterior retainer 114 that allows at least a portion of the exterior retainer 114 to move from a rest position/orientation, and out of the way, during insertion into the opening 18 of the piñata 10, and then return substantially to the rest position/orientation as the electronic device 100 is attached. For example, and as illustrated, the spring hinge 115 may be rotatable back and forth about center axis. The spring hinge 115 may be a discrete element of the exterior retainer 114, which is interspersed between a clipping or clamping leg and a mount to the housing 110. Alternately, the spring hinge 115 may be a feature distributed along or otherwise integrated into the exterior retainer 114. For example, the exterior retainer 114, may be embodied as a single cantilever member, fixed to the housing 110 and having sufficient flexibility to flex out of the way during insertion and form a clamping couple once seated in place. This may be beneficial as a means to insert or protect bulky or more delicate portions of the electronic device 100 inside the piñata 10, as a greater girth may be maneuvered.

Figure 6A:
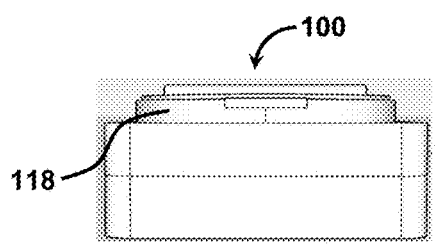
Figure 6B:
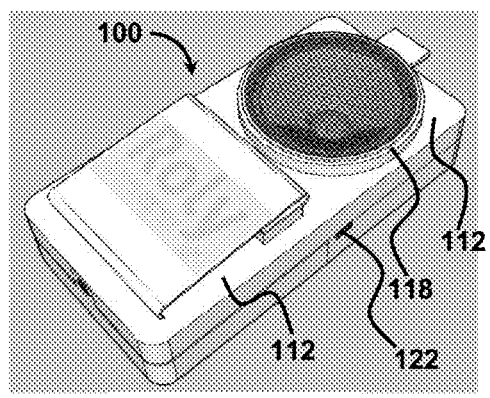
Figure 6E:
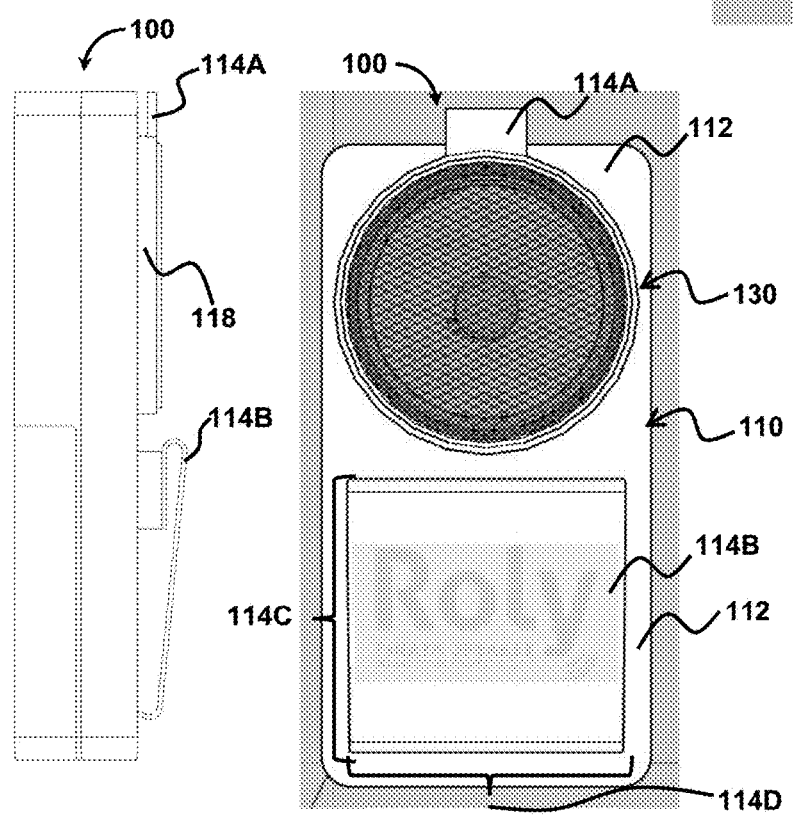
Figure 6E:
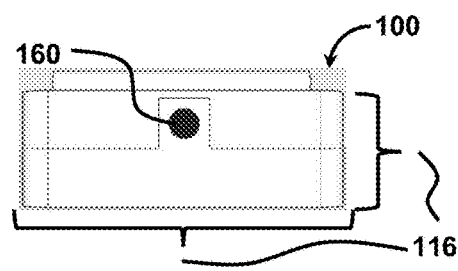

The power supply 120 is configured to power the electronic device 100. In particular, the power supply 120 may be selected or designed to drive speakers sufficiently loud to be heard outdoors, as discussed below. Preferably, the power supply 120 will be a portable energy storage, such as one or more batteries. According to one embodiment, the battery or batteries may be rechargeable. The power supply 120 may include an external charge port 122 (FIG. 6B) such as cable connector plug in socket. According to one embodiment, the external charge port 122 may be configured to communicate both charge data, for example being configured as a microUSB connection.

As above, the speaker 130 may be affixed to the housing 110, and further, may be arranged to face away from the piñata 10, i.e., when the housing 110 is attached to the piñata 10. The speaker 130 may include one or more speakers. In particular, the speaker may 130 be an outdoor speaker or otherwise selected or designed be sufficiently loud to be heard outdoors. For example the speaker may 130 be rated at 1 watt or greater, and/or may have a diameter of at least 2 inches, approximately 2 inches, 3 to 5 inches, or 2 to 6 inches. Preferably, the speaker 130 is sized and dimensioned to substantially cover the aperture, e.g., greater than 50%, between 75% and 100%, or greater than 100%. This may be beneficial as piñatas are typically used outdoors and a larger speaker (e.g., 2 to 6 inches) may have better performance than speakers typically found in consumer electronic devices (e.g., <1 inch). According to one embodiment, the speaker 130 may be combined with or otherwise serve as the exterior retainer 114, e.g., were the speaker covers greater that 100% of the opening 18. According to one embodiment the speaker may have a diameter of 55 mm and a voltage rating of 4.5 V.

The impact sensor 140 is configured to sense vibrations or an impact to the piñata 10, and to communicate an impact signal in response. It is understood that the impacts referred to are impacts associated with piñata use, such as strikes with a broom stick or other striking object. The impact sensor 140 may use any convenient sensing technique or technology, such as accelerometers, microphones, etc. Further, the impact sensor 140 may be of sufficient sensitivity to differentiate different degrees of impact. In which case, the impact sensor 140 may be further configured to include data indicating impact degree in the impact signal. The impact signal may be digital or analog. According to one embodiment, the impact sensor 140 may include a motion sensor. Alternately, the motion sensor may separate or replace the impact sensor 140.

The controller module 150 may be generally embodied as an appropriately configured module, part, or units for its function. In particular, controller module 150 may include may include a memory module 152, a communication module 154, and a processor module 156. It is understood that one or more sub-modules of the controller module 150 may be combined, integrated, or otherwise share resources. For example, the memory module 152, the communication module 154, and the processor module 156 may include one or more electronically coupled components mounted to a printed circuit board (PCB), which is fixed to and housed by the housing 110. According to one embodiment, the housing 110 may be miniaturized, ruggedized, and/or sealed.

It should be further understood the various illustrative blocks and modules described throughout can be implemented in various forms. The terms "module," "component" or "circuit" as used herein, individually or collectively refer to hardware, firmware, software and any associated hardware that executes the software, or any combination of these elements for performing the associated functions described herein. Some blocks and modules have been described above generally in terms of their functionality, which may be implemented depending upon design constraints imposed on an overall system. Skilled persons can implement the described functionality in a variety of ways in each particular application. Further, the grouping of functions within a module, block, or unit is for ease of description. Specific features or functionality can be moved from one module or block or distributed across to modules or blocks without departing from the disclosure.

The memory module 152 is configured to persistently store a plurality of piñata communications 50 (FIG. 8), such as sounds, words, or phrases, as discussed throughout. In particular, the memory module 152 may include any non-transitory computer-readable or processor-readable storage media and any associated circuitry. By way of example but not limitation, such non-transitory computer-readable or processor-readable storage media may include onboard FLASH memory, dynamic memory, RAM, ROM, EEPROM, FLASH memory, optical/magnetic disk storage, or any other medium that may be used to store desired program code in the form of instructions or data structures and that may be accessed by a processor or computer. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product. If implemented in software, the functions may be stored on or transmitted over as one or more instructions or code on a computer-readable medium.

The processor module 156 is configured to receive the impact signal from the impact sensor 140, to select at least one of the plurality of piñata communications from the memory module 152, and to command the speaker 130 to emit at least one of the plurality of piñata communications in response to receiving the impact signal. The processor may be further configured to perform one or more tasks as discussed further herein. The processor module 156 may be communicably coupled to the memory module 152 and the communication module 154. The processor module 156 may operate using instructions, algorithms, and data stored thereon. For example, the memory module 152 may contain the stored plurality of piñata communications and other data, may execute code stored on the memory module 152, and may utilize data stored on the memory module 152, for example, to send those piñata communications to be emitted by speaker 130.

The processor module 156 may include a general purpose processor, an integrated circuit (IC), an analog IC, a mixed signal IC, an application specific integrated circuit (ASIC), a field programmable gate array (FPGA), a digital signal processor (DSP), System on a Chip (SoC), and/or other programmable logic devices, discrete gates or transistor logic, discrete hardware components, or any combination thereof designed to perform the functions described herein. The general-purpose processor may be a microprocessor, but, in the alternative, the processor may be any conventional processor, controller, microcontroller, or state machine. The processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. Further, the processor module 156 may be a stand-alone device or may be part of a larger device. Also, features and attributes of the specific example modules disclosed above may be combined in different ways to form additional modules or may be embodied as software and/or firmware on or of a processor the processor module 156, all of which fall within the scope of the controller module 150. Preferably, the processor module 156 may be embodied as or otherwise include a microcontroller. The microcontroller may contain a clock and calendar. The microcontroller may include or utilize with long term battery (i.e., in addition to and apart from the power supply 120).

The communication module 154 may be configured to communicate to the user interface 160 and/or other remote electronic devices, as discussed further herein. The communication module 154 may communicably couple one or both to the controller module 150, particularly the processor module 156. The communication module 154 may be at least partially integrated with processor module 156.

Figure 8:
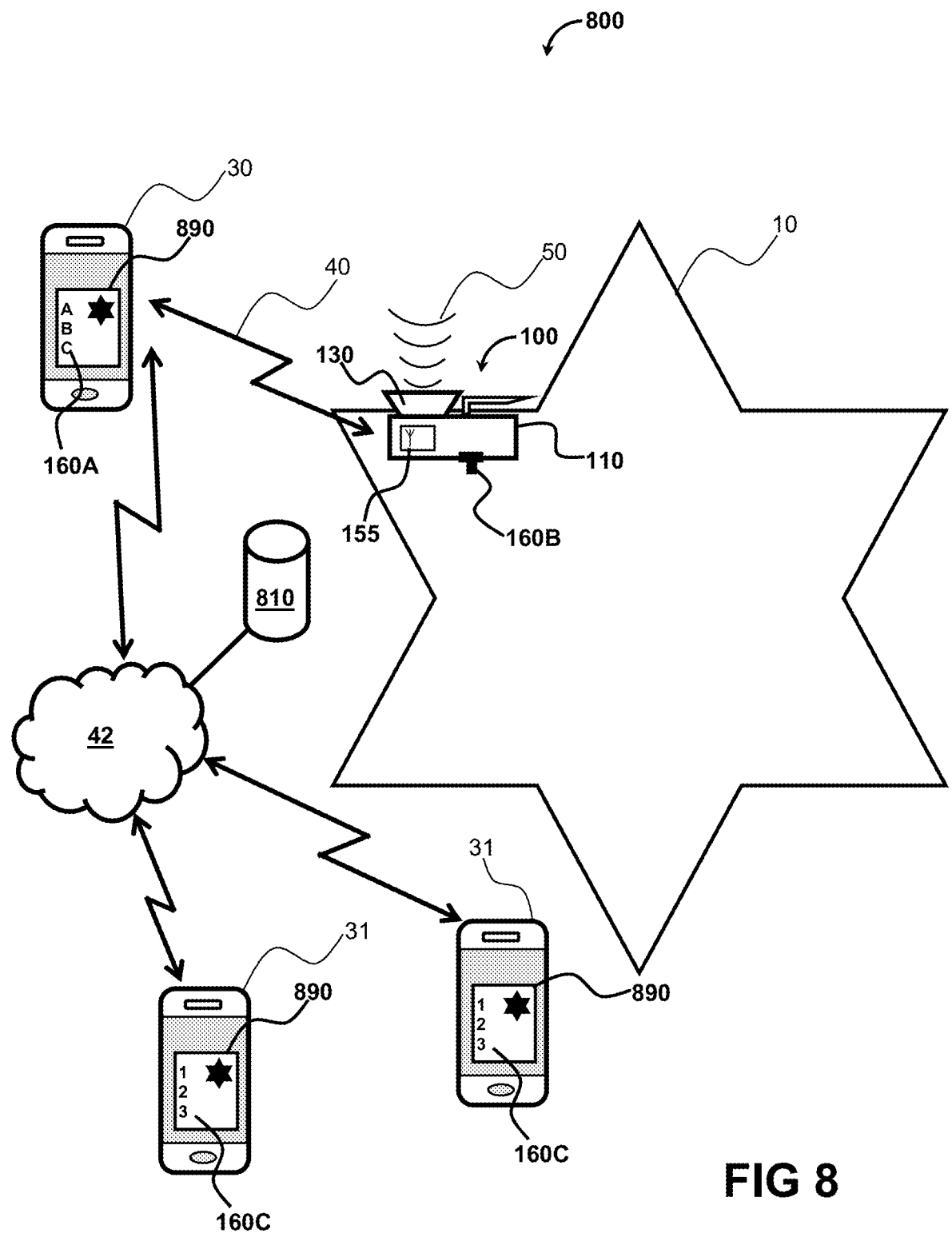
FIG. 8 is a schematic diagram of an electronic device for a piñata, according to another embodiment of the present disclosure.

According to one embodiment, the communication module 154 may communicably couple with other remote devices or portable memories via wired connection (e.g., USB port/cable) or wirelessly (e.g., Bluetooth). Further, the communication module 154 may refer to or otherwise include a wireless communication radio 155 described below (FIG. 8). As such the communication module 154 may include a radio frequency IC (RFIC) or an ASIC, or other wireless communication device/radio/transceiver. The RFIC may be an RF receiver (RFR) or an RF transmitter/receiver (RTR) and the ASIC may be a mobile station modem (MSM).

According to one embodiment, the controller module 150 may be configured to persistently store at least one of the plurality of piñata communications 50 by directly downloading one or more files or piñata communications stored on a remote memory device, such as a USB flash drive. In particular, the communication module 154 may incorporate a communication port such as a microUSB port or otherwise be configured to communicate with the remote memory device, and the processor module 156 may be configured to download or otherwise import the stored file into the memory module 152.

The user interface 160 is configured to communicate with the communication module and to operate the electronic device 100 by the user. In particular, the user interface 160 may include features configured to turn the electronic device 100 on and off, select an operation mode, select a which piñata communication(s) will be made through the speaker 130. The user interface 160 may further include means for data or sound entry, such as a virtual or actual keypad, microphone, or intermediate communication module/port configured to communicate to a peripheral user input device. The user interface 160 may be separate from or integrated with the controller module 150. The user interface 160 may be fixed to otherwise accessible from the housing 110. For example, the user interface 160 may include any combination of user interface (U/I) or user input means to the controller module 150, such as physical selectors (e.g., buttons, switches, etc.), digital selectors (e.g., touch screen, voice command, etc.), and any other convenient U/I technology. According to one embodiment, the user interface 160 may include an on/off switch/button on the housing 110, and other aspects of the user interface 160 may be shared with another electronic device or otherwise be remote from the housing 110 (e.g., controls accessible from a mobile phone. Account [PLEASE PROVIDE DIFFERENT VARIATIONS/CONFIGURATIONS OF THE USER INTERFACE (U/I), E.G., WHAT IS INSIDE/OUTSIDE OF PINATA, WHAT TYPE OF U/I ARE CONTEMPLATED (BUTTONS? SWITCHES? TOUCH PAD? VOICE COMMAND? ETC.]

Figure 4A:
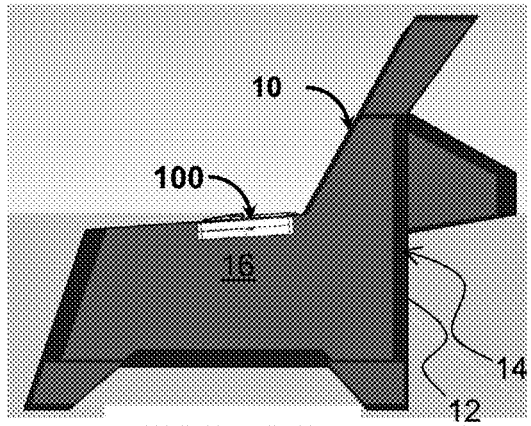
FIGS. 4A-4D are various views of an electronic device for a piñata, while in a first "in use" condition, according to an exemplary embodiment of the present disclosure.
Figure 4B:
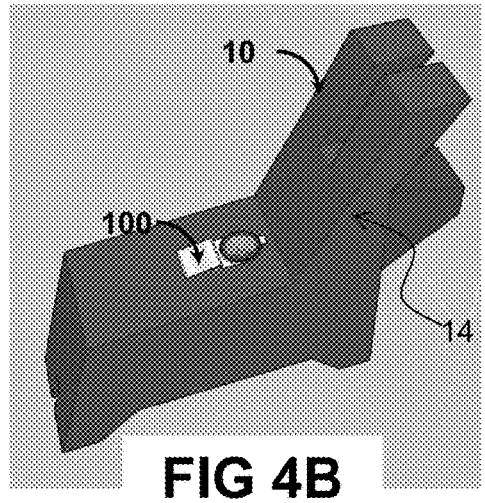
Figure 4C:
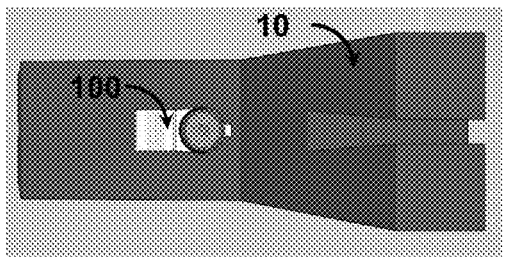
Figure 4D:
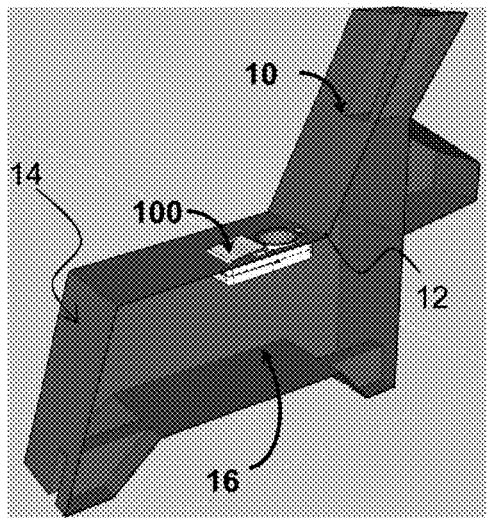

FIGS. 6A-6E are various views of an electronic device for a piñata, according to one embodiment of the present disclosure. Here, the electronic device 100 is configured to attach to the piñata wall 12 (FIG. 4D). As shown and as above, the electronic device 100 may include the housing 110, the interior retainer 112, the exterior retainer 114, the external charge port 122, the speaker 130, the impact sensor 140, and the user interface 160.

As shown, the housing 110 may be configured to enclose one or more electronic components discussed above, and further may include one or more access ports, including device controls (e.g., on/off, volume, selector, etc.) and/or internal component connections (e.g., data, power, USB, etc.). Further, the housing 110 may be substantially shaped as a rectangular cuboid, where the insertion profile 116 may be defined by an inferior face (i.e., here, the rectangular face having the smallest surface area).

The housing 110 may also include a translation retainer 118 configured, inter alia, to engage the piñata wall 12 (FIG. 4D) or otherwise inhibit lateral movement, relative to the surface of the piñata wall 12 (once the electronic device 100 is installed). In particular, the translation retainer 118 may be embodied as one or more features that extend outwardly from an outward facing superior face (relative to being installed in a piñata).

According to one embodiment, and as shown, the housing 110 may be substantially shaped as a rectangular cuboid, where the speaker 130 is fixed to and extends from an outward facing superior face. Here, the housing 110 includes the interior retainer 112, the exterior retainer 114A/B, and the translation retainer 118. Here, the interior retainer 112 is defined by exposed portions of the outward facing superior face.

Also, here, the translation retainer 118 is a cylindrical wall or lip that extends from the exposed portions of the outward facing superior face, and which circumscribes the speaker 130. The translation retainer 118 has a cylinder height of at least the thickness of the piñata wall 12. According to one embodiment, the translation retainer 118 may have a cylinder height of between 1 mm and 20 mm.

Also, here, the exterior retainer 114A/B includes a fixed member and a dynamic member. In particular, the exterior retainer 114A/B is embodied as a tab 114A (fixed member) and a spring clip 114B (dynamic member). The tab 114A may be fixed to and extend from the translation retainer 118 in a first direction parallel to the outward facing superior face of the housing 110. The spring clip 114B may include a cantilevered spring, such as a folded flat spring, and may be fixed to the outward facing superior face of the housing 110, and extends opposite the 114A. The spring clip 114B may be at least partially or entirely made of plastic, metal, or other suitable material. Portions of the spring clip 114B may be configured to include indicia such as branding indicia for example. For example, and as illustrated, outward facing portions of the spring clip 114B may have a clip height 114C that is at least a third of the height of the housing 110, and a clip width 114D that is at least a half of the width of the housing 110.

Regarding attachment, the tab 114A may be arranged together with portions of interior retainer 112 to form a groove or slot which the piñata wall 12 may be slid into. Likewise the spring clip 114B may be configured together with other portions of interior retainer 112 to form a groove or slot which the piñata wall 12 may be slid into. Here however, the spring clip 114B may be further configured to clamp onto the piñata wall 12 such that it is held in compression between the spring clip 114B and the other portions of interior retainer 112 underneath.

Figure 7A:
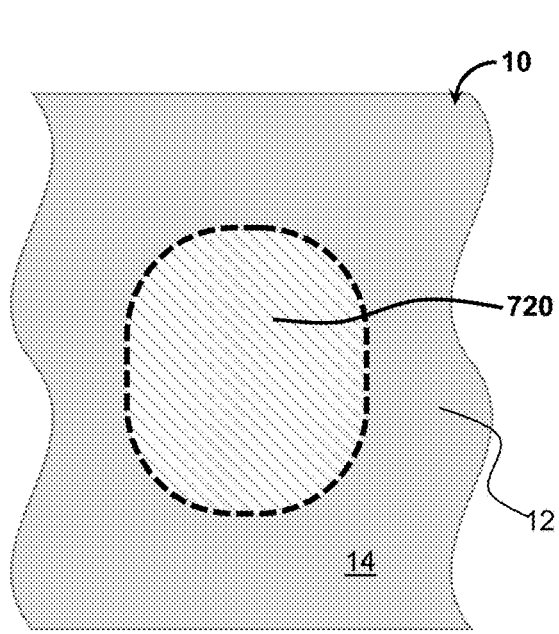
FIGS. 7A-7C show various stages of inserting the electronic device of FIGS. 6A-6E into a piñata.
Figure 7B:
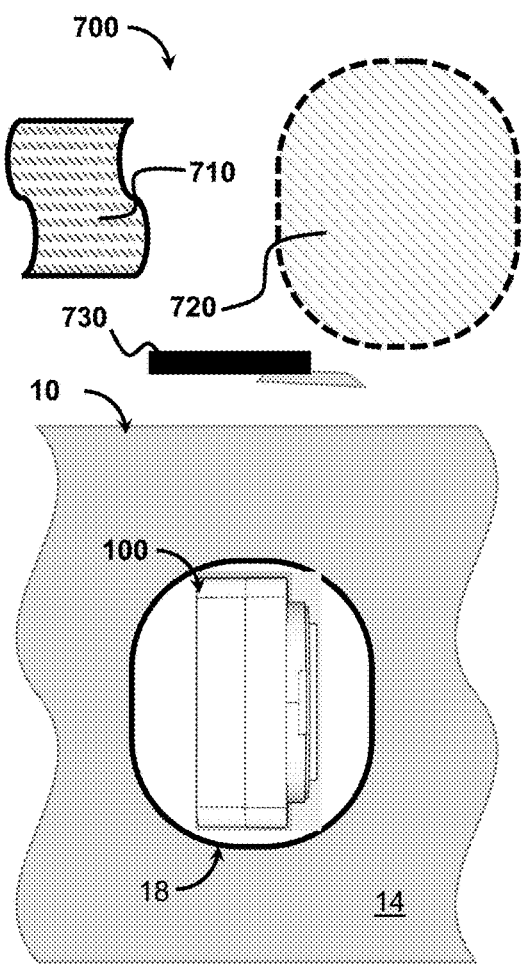
Figure 7C:
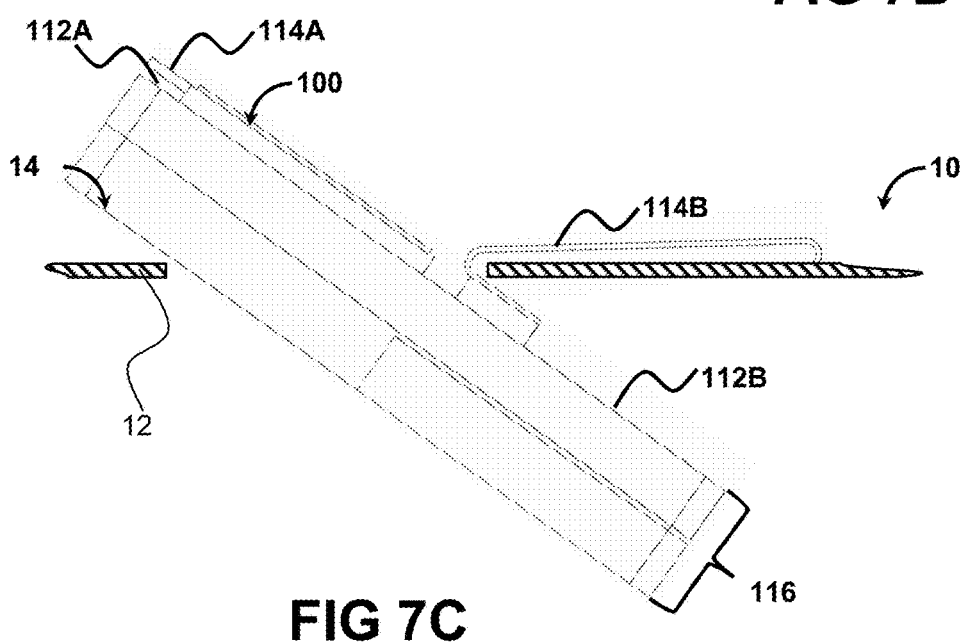

FIGS. 7A-7C show various stages of inserting the electronic device of FIGS. 6A-6E into a piñata. According to one embodiment the electronic device 100 may be included as part of a kit 700, with the kit 700 further including at least one of a set of instructions 710, a cutting template 720, and a piñata cutter 730. The set of instructions 710 may include any combination of piñata cutting instructions, piñata setup instructions, electronic device instructions, play instructions, piñata history, and app instruction. The set of instructions 710 may be in physical form or digital form. The piñata cutter 730 may include any convenient cutting utensil suitable for cutting piñata materials, e.g., scissors, knife, razor fixed to handle, etc.

The cutting template 720 may be a disposable (e.g., paper sheet) or reusable (e.g. cardstock, plastic, etc.) material, sized and dimensioned to cut the aperture (opening 18) in the piñata 10. Being that the electronic device 100 will interact with and utilize the piñata wall 14, having a shape and size appropriate to insert and couple the electronic device 100 may become critical. For example, an aperture that is too small or the wrong shape will need to be recut and may result cutting into a structural member (e.g., frame), and an aperture that is too big may result in suboptimal support of the electronic device 100. In addition, having the cutting template 720, the user may have greater freedom in placement of the electronic device 100. For example, rather than reutilizing a piñata filling aperture (which, if precut may provide a suboptimal fit), the user may attach the electronic device 100 in any convenient location, such as area less likely to be hit and having a cavity that is not filled, or a "speaking" area such as a head or mouth.

As shown, installation may include the steps of placing the template 720 onto the piñata 10, cutting the opening 18 through the piñata wall 12, inserting the electronic device 100 partially into the piñata 10 via its insertion profile 116 and while opening the spring clip 114B, sliding the piñata wall 12 into a groove or slot formed between the tab 114A and a first portion of interior retainer 112A, and clamping the spring clip 114B onto the piñata wall 12 such that it is held in compression between the spring clip 114B and a second portion of interior retainer 112 underneath.

FIG. 8 is a schematic diagram of an electronic device for a piñata, according to another embodiment of the present disclosure. In particular, the electronic device 100 is integrated into a system 800 including aspects of a third party device 30 (e.g., parent's device) accessible via a wireless communication link 40 and an application 890 installed on or otherwise accessible by the third party device 30.

As above, the electronic device 100 may include the housing 110, the power supply 120 (FIG. 5), the speaker 130, the impact sensor 140 (FIG. 5), and the user interface 160 (FIG. 5). Also as above and as shown, the speaker 130 may be fixed to and extends from an outward facing superior face of the housing 110, relative to the electronic device 100 being installed on the piñata 10, such that the piñata communications 50 are emitted away from the piñata 10.

According to one embodiment, aspects of the user interface 160 may be at least partially remote from the housing 110. In particular, the one or more features of the user interface 160 may operable via the third party device 30, which may be communicably coupled with the communication module 154 via a communications link (e.g., the wireless communication link 40). For example, the third party device 30 may be a mobile device, such as a smartphone having a downloaded mobile app (application 890) installed. Also for example, the user interface 160 may include a first set of controls 160A accessible by the third party device 30 and a second set of controls 160B fixed to the housing 110 of the electronic device 100. Exemplary controls may include controls directly related to device operation, such as on/off, volume, response selection, sensitivity selection, etc., as well as indirectly related to past/present/future device operation, such as hitter scheduling, hitter announcing, party notifications, customization based on attendees or the piñata communications 50 (including user instructions, piñata history, language selection, etc.). To illustrate, the user may operate the first set of controls 160A to receive instructions on: how to install the electronic device 100, how to generally use the electronic device 100, how to specifically use the electronic device 100 to play different games recorded or otherwise included in the application 890. Additionally, the first and second set of controls 160A, 160B may be physical, virtual, or a combination thereof.

Further, the communication module 154 may include a wireless communication radio 155. Preferably, the wireless communication radio 155 may be configured to communicate over a wireless personal area network (WPAN) using a wireless technology standard such as Bluetooth. However, in alternate embodiments the wireless communication radio 155 may be configured to communicate over other WPAN protocols or other types of networks (e.g., WLAN, WWAN, NFC, etc.).

According to one embodiment, the system 800 may further include a backend server 810 and aspects of additional third party devices 31 (e.g., guests' devices) having the application 890 (or a variant thereof) installed on or otherwise accessible by the additional third party devices 31. One or more third party devices 30, 31 may be communicably coupled to the backend server 810 via the internet 42. Further, one or more third party devices 30, 31 may be a mobile device (e.g., smart phone), a desktop device (e.g., laptop computer), a plurality of user devices (e.g., multiple single user cloud-connected devices), or any combination thereof.

According to one embodiment, the application 890 may be configured to communicate with or message the additional third party devices 31 information relating to future use of the piñata 10. For example, the application 890 may be configured to communicate information regarding a future piñata party to the additional third party devices 31, such as: invite, location, time, gift info, event reminders, piñata/device info/rules/history, etc. Also for example, the application 890 may be configured to collect recipient information (e.g., attendance confirmation, name, age, skill level, etc.). For example, as part of an invite sent to a potential piñata partygoer, the invite may ask for one or more of the above, and provide it to the piñata party host and/or utilize it for further operations/applications.

According to one embodiment, the application 890 may be configured to communicate with or message the additional third party devices 31 information relating to current use of the piñata 10. For example, the application 890 may be configured to communicate information (e.g., piñata communications 50) regarding an ongoing piñata party to the additional third party devices 31, such as: announcing the beginning of the hitting, announcing a hitting order, announcing a hitter's turn beginning and/or ending, emit generalized comments/songs/noises, emit personalized comments to the hitter/waiting hitters, issue safety warnings, etc. To illustrate, a user (e.g., a parent) may use the first set of controls 160A of third party device 30 to change the traditional children's' song "Dale dale!", and put the words, sounds, phrases, etc. or otherwise modify the electronic device 100, using the application 890. To illustrate, the user may use the first set of controls 160A of third party device 30 help to organize the kids to start the line for hitting the piñata using the application 890.

According to one embodiment, the application 890 may be configured to communicate with or message the additional third party devices 31 information relating to past use of the piñata 10. For example, the application 890 may be configured to communicate information regarding a past piñata party to the additional third party devices 31, such as: sending thank you messages (e.g. a text/email/message stating "Thank you for joining us"), or other communications/followup customarily given after a party.

Figure 9A:
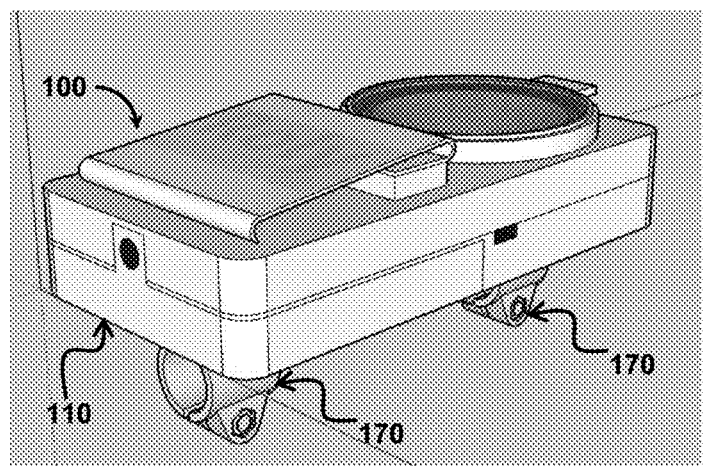
FIGS. 9A-9C are various views of an electronic device for a piñata, according to another embodiment of the present disclosure.
Figure 9B:
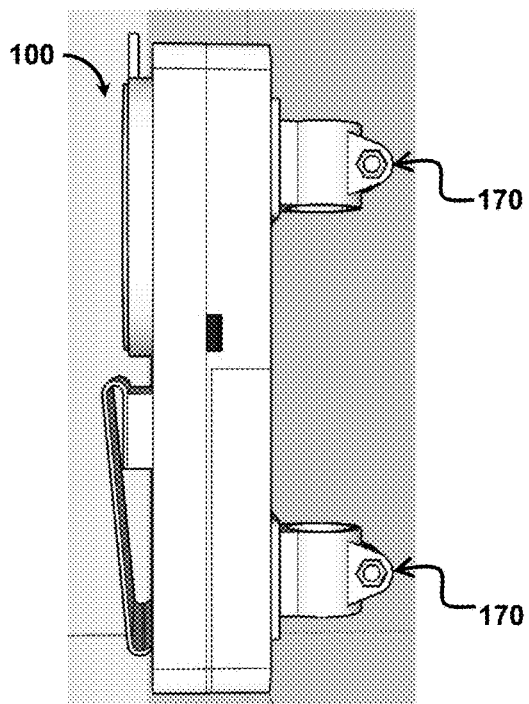
Figure 9C:
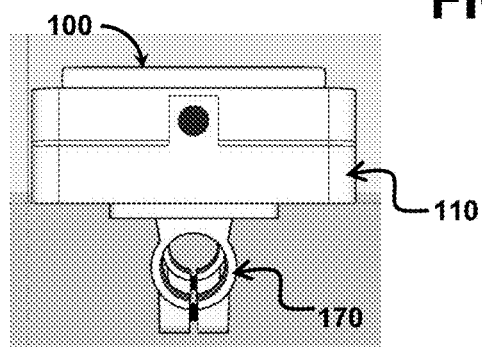
Figure 12A:
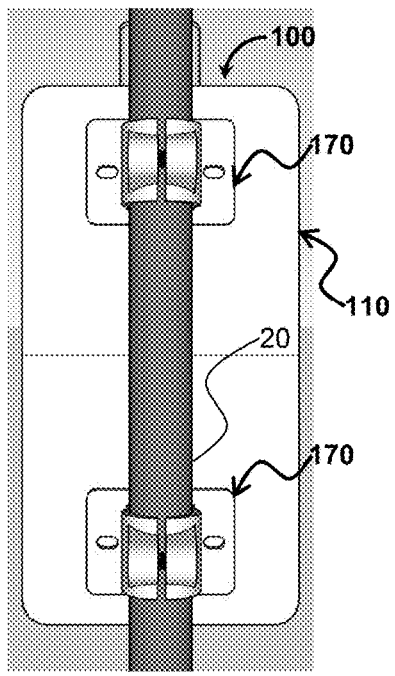
FIGS. 12A-12D are various views of an electronic device for a piñata, according to yet another embodiment of the present disclosure, while in a third "in use" condition.
Figure 12B:
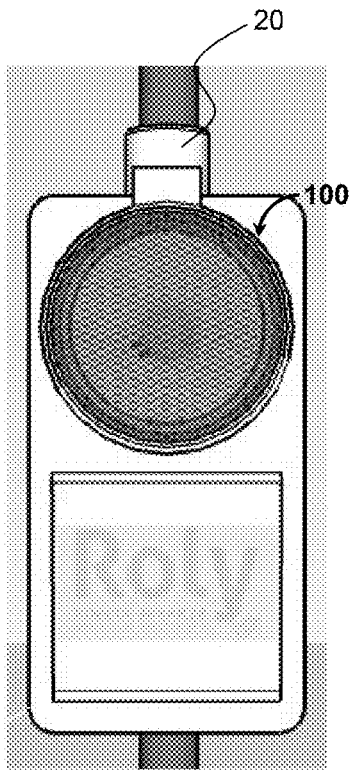
Figure 12D:
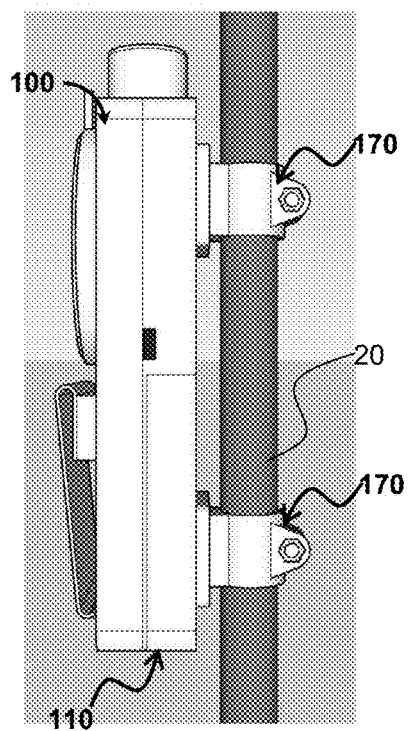
Figure 12C:
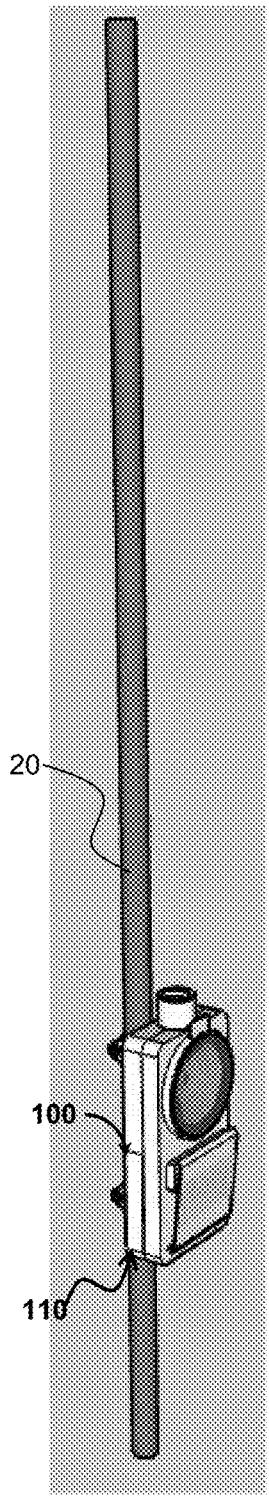

FIGS. 9A-9C are various views of an electronic device for a piñata, according to another embodiment of the present disclosure. In particular, the electronic device 100 may be configured to attach to a shaft of the striking object, ("stick"). The electronic device 100 may include one or more striker-shaft couples 170 incorporated into or otherwise coupled to the housing 110. The striker-shaft couple 170 may be configured to clamp onto or otherwise couple with the shaft of the stick 20 (FIG. 12A). For example, the striker-shaft couple 170 may be any fastener or clamping device having a decoupled state and a coupled state where the electronic device 100 may be fixed to the stick 20.

According to one embodiment, the striker-shaft couple 170 may be embodied as a clamp collar (e.g., one piece or two piece) that is mounted the housing 110. The striker-shaft couple 170 may be coupled and decoupled via a threaded fastener, for example an Allen head fastener. Alternately, the striker-shaft couple 170 may include or otherwise be configured to couple and decouple via a "quick release" or tool less fastener. It should be understood that other types of shaft fasteners are contemplated. Further, additional features may be incorporated in the striker-shaft couple 170 and/or elsewhere in the electronic device 100 to mitigate shock and vibration while in use.

In some embodiments one or more striker-shaft couples 170 may be sized and dimensioned for different shaft diameters, for example, about 2 cm to 3 cm ("broomstick size"), about 3 cm to 4 cm ("shovel handle" size), or about 2.5 cm to 5 cm ("baseball bat size"). According to one embodiment, the electronic device 100 may include one or more striker-shaft couples 170 that are adjustable between 2 cm and 5 cm. Advantageously, the electronic device 100 may be attached to the stick 20 in a variety of positions (e.g., above, below, and including a hand grip locations), and may be slid or otherwise adjusted to a variety of users. Where the electronic device 100 is placed in the grip location, at least portions of the housing 110 may include a hand grip or otherwise be ergonomically shaped for a user's hands.

According to a preferred embodiment, the electronic device 100 may include two striker-shaft couples 170 mounted to the housing 110, and aligned so as to both simultaneously attach to the stick 20. For example and as shown, the two striker clamps 170 may be mounted to one side of the housing 110, and axially aligned such that, when in their decoupled state, the stick 20 may be slid through the two striker clamps 170. Once the electronic device 100 is positioned and oriented on the stick 20 as desired, it may be locked into place by subsequently clamping down on the two striker clamps 170, such that they are placed in their coupled state. As above, other clamping means and combinations are contemplated.

Figure 10A:
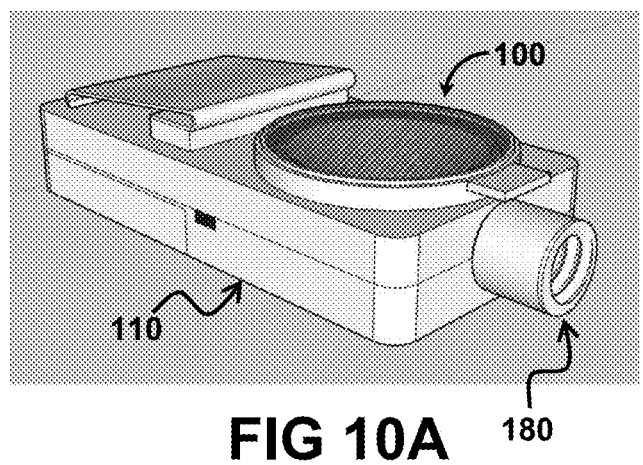
FIGS. 10A-10B are various views of an electronic device for a piñata, according to another embodiment of the present disclosure.
Figure 10B:
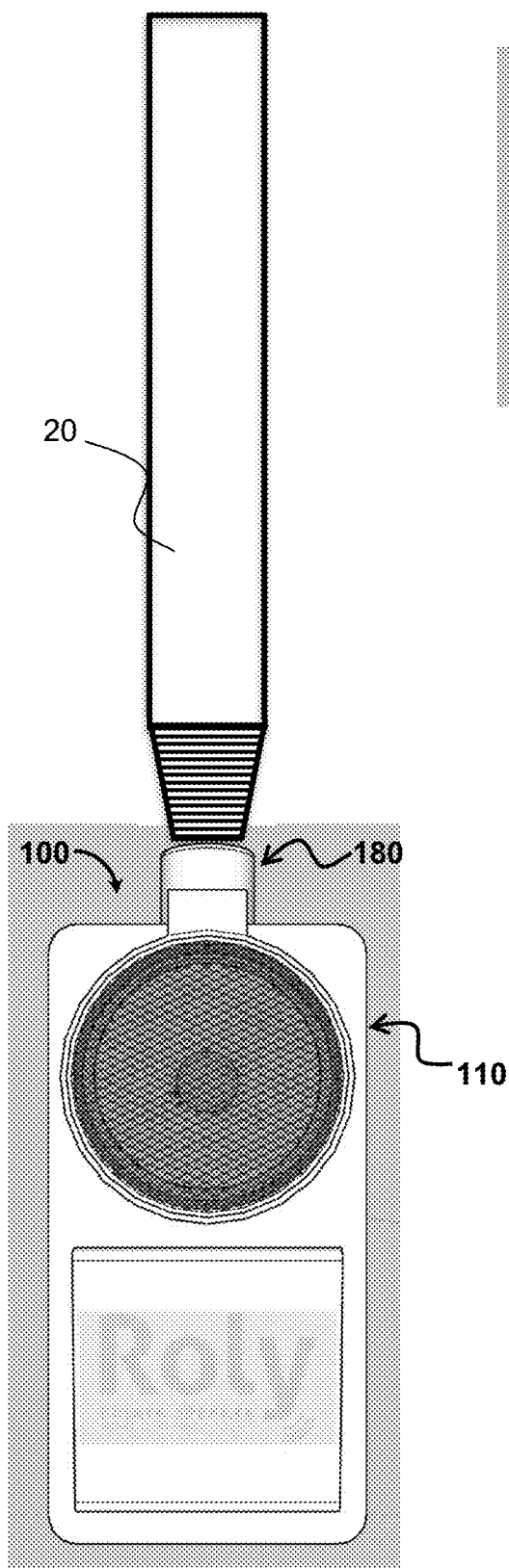
Figure 11A:
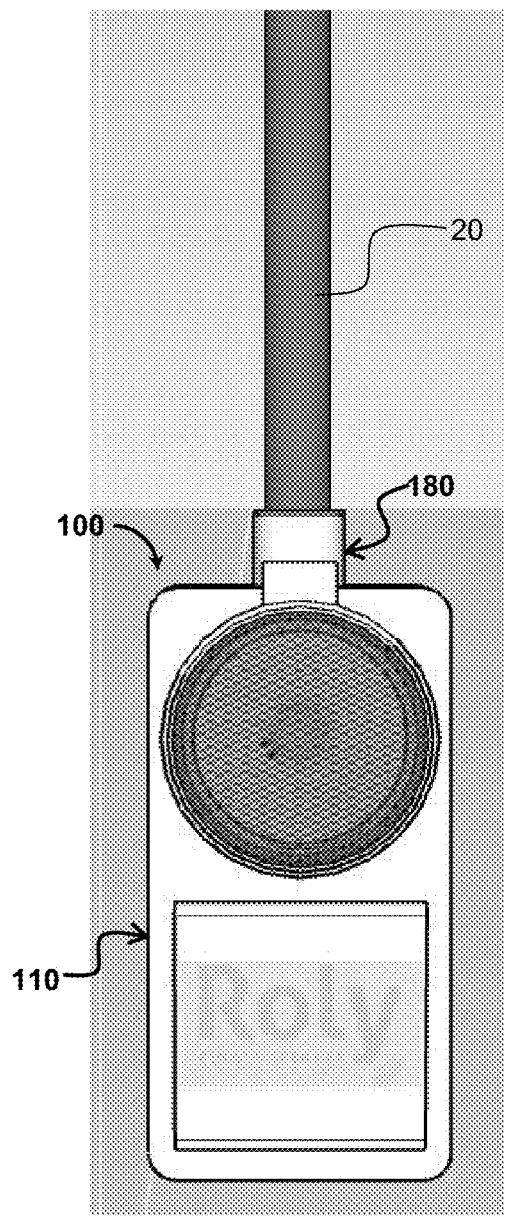
FIGS. 11A-11B are various views of the electronic device of FIGS. 10A-10B, while in a second "in use" condition.
Figure 11B:
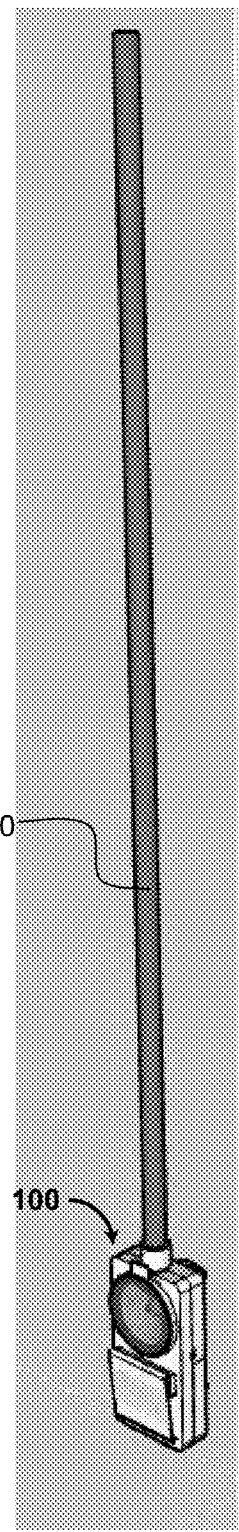

FIGS. 10A-10B are various views of an electronic device for a piñata, according to another embodiment of the present disclosure. FIGS. 11A-11B are various views of the electronic device of FIGS. 10A-10B, while in a third "in use" condition. As above, the electronic device 100 may be configured to attach to the stick 20. However, here, the electronic device 100 may be configured to attach to an end of the shaft of the stick 20. In particular, the electronic device 100 may include a striker-end couple 180 incorporated into or otherwise coupled to the housing 110.

According to one embodiment, the striker-end couple 180 may be configured to screw onto or otherwise couple with the end of the shaft of the stick 20. For example, the striker-end couple 180 may include a threaded socket, where the electronic device 100 may be screwed on to the stick 20. Further, the striker-end couple 180 may be configured to mate with standard broom end (e.g., ¾" 5 pitch thread). Similar as above, additional features may be incorporated in the striker-end couple 180 and/or elsewhere in the electronic device 100 to mitigate shock and vibration while in use. Likewise, the striker-end couple 180 may include other types of toolless couples (e.g., quick release collar, detent/circlip couple, etc.), and/or tooled coupling means (e.g., set screws, shear bolts, hose clamps, etc.).

FIGS. 12A-12D are various views of an electronic device for a piñata, according to yet another embodiment of the present disclosure, while in a third "in use" condition. As above, the electronic device 100 may be configured to attach to the stick. However, here, the electronic device 100 may be configured to attach to both the shaft of the stick 20 and to the end of the shaft of the stick 20. In particular, the electronic device 100 may include both a striker-end couple 180 and one or more striker-shaft couples 170 incorporated into or otherwise coupled to the housing 110, as discussed above.

Figure 13:
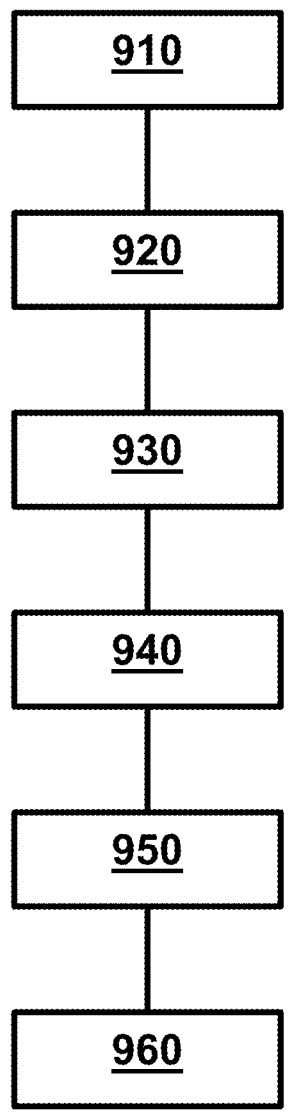
FIG. 13 is a flow diagram of method of interacting with a piñata, according to one embodiment of the present disclosure.

FIG. 13 is a flow diagram of method of interacting with a piñata, according to one embodiment of the present disclosure. In particular, the method of interacting with a piñata may include one or more components or features of the electronic device 100, as described above. As illustrated, the method 900 of interacting with a piñata may include the steps of: step one 910, providing a device such as the electronic device 100; step two 920, attaching the device to one of the piñata or the stick; and step three 930 communicating a piñata communication directly related to device operation/piñata use (e.g., in response to or otherwise related to the piñata being hit.). In addition, the method 900 may include one or more of the following optional steps: step four 940 selecting a mode of operation of the electronic device 100, step five 950 customizing at least one piñata communication of operation of the electronic device 100, step six 960 communicating a piñata communication indirectly related to past/present/future device operation.

It should be understood that the steps described in method 900 can be carried out in many different orders according to user preference. The use of "step of" should not be interpreted as "step for", in the claims herein and is not intended to invoke the provisions of 35 U.S.C. § 112(f). It should also be understood that, under appropriate circumstances, considering such issues as design preference, user preferences, marketing preferences, cost, structural requirements, available materials, technological advances, etc., and in view of the present disclosure, other steps for method 900 of interacting with a piñata are contemplated and taught herein.

Benefits may include providing a method, means, and system for interacting with a piñata. Further, the embodiments of the disclosure described herein are exemplary, and numerous modifications, variations and rearrangements can be readily envisioned to achieve substantially equivalent or similar results, all of which are intended to be embraced within the spirit and scope of the disclosure. Exemplary advantages of the present include but are not limited to (1) the electronic device may work as a seal cap for the piñata hole when the user is finished putting the candy inside; (2) using the device/system/method, the user may change the tradition of the song "Dale!" by putting the words, sounds, phrases, etc. in the electronic device; (3) using the interior retainer and exterior retainer, the electronic device may be placed in fun or otherwise user-defined locations (e.g., piñata's mouth); (4) it may be used to help organize the kids to start the line for hitting the piñata; (5) it may provide for a more familiar and functional user interface, by repurposing aspects of a user's own mobile device; (6) it may give instructions on how to install the component and how to use it, so you can play different games; (7) it may provide for much more detailed and involved interaction/planning with party goers before, during, and after the piñata activities; and (8) it may use location/language information/direct user input to provide personalized instructions (e.g., in a local language).

The disclosure has been sufficiently described so that a person of ordinary skill in the art can reproduce and obtain the results mentioned in the present disclosure. However, any skilled person in the field of the art of the present disclosure may be able to make modifications not described in the present application. Further, various modifications to the embodiments will be readily apparent to those skilled in the art, and the generic principles defined herein may be applied to other variations without departing from the spirit or the scope of this disclosure. Notwithstanding, if these modifications require a structure or manufacturing process not described in the present disclosure, the modifications should be understood to be within the scope of the claimed subject matter. Thus, it is to be understood that the disclosure is not intended to be limited to the examples and designs described herein, which merely represent a presently preferred implementation of the disclosure, but that the disclosure is to be accorded the widest scope consistent with the principles and novel features disclosed herein. It is to be further understood that the scope of the present disclosure fully encompasses other embodiments that may become obvious to those skilled in the art. Having sufficiently described the disclosure, it is claimed as the property contained in the following claims.

The invention claimed is:

1. An electronic device (100) for a piñata (10), the piñata including a piñata wall (12) defining an exterior (14) and an interior cavity (16), the electronic device comprising:
    a housing (110) configured to removably attach to the piñata, the housing having an insertion profile and being at least partially insertable into the interior cavity of the piñata via the insertion profile, the housing including an interior retainer (112) and an exterior retainer (114), said interior retainer configured to inhibit the housing from being removed from the piñata when attached to the piñata, said exterior retainer configured to inhibit the housing from traveling further into the interior cavity of the piñata when attached to the piñata;
    a power supply (120) affixed to the housing and configured to power the electronic device;
    a speaker (130) affixed to the housing and arranged to face away from the piñata when the housing is attached to the piñata;
    an impact sensor (140) affixed to the to the housing, the impact sensor configured to sense an impact to the piñata, and to communicate an impact signal;
    a controller module (150) affixed to the housing, the controller module including a memory module, a communication module, and a processor module, the memory module configured to persistently store a plurality of piñata communications, the processor module configured to receive the impact signal from the impact sensor, to select at least one of the plurality of piñata communications from the memory module, and to command the speaker to emit at least one of the plurality of piñata communications in response to receiving the impact signal; and
    a user interface (160) configured to communicate with the communication module and to operate the electronic device by a user, wherein the user interface is further configured to customize at least one of the plurality of piñata communications, and to store at least one custom piñata communication in the memory module of the controller module,
    wherein the user interface includes an on/off switch affixed to the housing, and a digital interface integrated with a downloadable application for a user device remote from the from the housing, said digital interface communicably coupleable to the communication module of the controller module.

2. The electronic device of claim 1, wherein impact sensor is further configured to measure different degrees of intensity of the impact to the piñata body, and the impact signal include the measured different degree of intensity of the impact; and
    wherein the controller module is configured to select the at least one of the plurality of piñata communications in response to the measured different degree of intensity of the impact.

3. The electronic device of claim 1, wherein the controller module is configured to communicate at least one of the plurality of piñata communications in a plurality of languages.

4. The electronic device of claim 3, wherein the user device is a mobile communication device; and
    wherein the communication module of the controller module includes a wireless communication radio (155) communicably coupleable to the mobile communication device over a wireless communication link.

5. The electronic device of claim 1, wherein the controller module is configured to persistently store at least one of the plurality of piñata communications by directly downloading one or more files stored on a remote memory device via the communication module and into the memory module.

6. The electronic device of claim 1, wherein the piñata further includes a fill opening; and
    wherein the speaker is sized and dimensioned to substantially cover the opening fill opening of the piñata, and is arranged to face away from the piñata when the housing is attached to the piñata.

7. The electronic device of claim 6, wherein the piñata further has a piñata wall; and
    wherein the interior retainer and the exterior retainer are together configured to removably clip onto opposing sides of the piñata wall under spring force coupling.

8. The electronic device of claim 1, further comprising a striker-shaft couple (170) incorporated into or otherwise coupled to the housing, the striker-shaft couple configured to clamp onto or otherwise couple with a shaft of a piñata hitting stick.

9. The electronic device of claim 1, further comprising a striker-end couple (180) incorporated into or otherwise coupled to the housing, the striker-end couple including a threaded socket configured to screw onto or otherwise couple with an end of a piñata hitting stick.

10. The electronic device of claim 1, further comprising a cutting template (720), said cutting template sized and dimensioned to cut an aperture in the piñata, said aperture appropriate to insert and couple the electronic device to the piñata; and
    wherein the electronic device and the cutting template 720 are included together as part of a kit.

11. A system for interaction with a piñata via a mobile device, the piñata including a piñata wall defining an exterior and an interior cavity, the system comprising:
    an electronic device including
        a housing configured to removably attach to the piñata, the housing having an insertion profile and being at least partially insertable into the interior cavity of the piñata via the insertion profile, the housing including an interior retainer and an exterior retainer, said interior retainer configured to inhibit the housing from being removed from the piñata when attached to the piñata, said exterior retainer configured to inhibit the housing from traveling further into the interior cavity of the piñata when attached to the piñata,
        a power supply affixed to the housing and configured to power the electronic device,
        a speaker affixed to the housing and arranged to face away from the piñata when the housing is attached to the piñata, an impact sensor affixed to the to the housing, the impact sensor configured to sense an impact to the piñata, and to communicate an impact signal, and a controller module affixed to the housing, the controller module including a memory module, a communication module, and a processor module, the memory module configured to persistently store a plurality of piñata communications, the communication module including a wireless communication radio, the processor module configured to receive the impact signal from the impact sensor, to select at least one of the plurality of piñata communications from the memory module, and to command the speaker to emit at least one of the plurality of piñata communications in response to receiving the impact signal;

an application installed on or otherwise accessible by the mobile device; and an user interface configured to communicate with the communication module and to operate the electronic device by a user, the user interface including a first set of controls accessible by the mobile device via the application, and a second set of controls fixed to the housing of the electronic device, the first set of controls communicably coupled with the processor via the wireless communication radio.

12. The system of claim 11, wherein the user interface is further configured to personalize at least one of the plurality of piñata communications stored on the electronic device by inserting at least one word into said piñata communication.

13. The system of claim 11, wherein the application is configured to send invitations to a plurality of remote third parties.

14. The system of claim 13, wherein the application is further configured to receive confirmations of invitations sent to the plurality of remote third parties, and to incorporate at least a name from each received confirmation into the plurality of piñata communications stored on the electronic device.

15. The system of claim 14, further comprising:

a backend server communicably coupled to an Internet;

aspects of a plurality of third party devices having the application installed on or otherwise accessible by the plurality of third party devices, said plurality of third party devices communicably coupled to the backend server via the Internet; and wherein the application is configured to send the invitations and to receive the confirmations of the invitations sent via the backend server.

16. The system of claim 15, wherein the application is further configured to communicate at least one indirect piñata communication to the plurality of third party devices, at least one indirect piñata communication selected from an instruction on use or history of piñatas, an announcement to begin hitting the piñata, an announcement for the specific hitter's turn to begin, an announcement for a specific hitter's turn to end.

17. A method for interaction with a piñata, the piñata including a piñata wall defining an exterior and an interior cavity, the method comprising the steps of:

providing an electronic device including a housing configured to removably attach to the piñata, the housing having an insertion profile and being at least partially insertable into the interior cavity of the piñata via the insertion profile, the housing including an interior retainer and an exterior retainer, said interior retainer configured to inhibit the housing from being removed from the piñata when attached to the piñata, said exterior retainer configured to inhibit the housing from traveling further into the interior cavity of the piñata when attached to the piñata, a power supply affixed to the housing and configured to power the electronic device, a speaker affixed to the housing and arranged to face away from the piñata when the housing is attached to the piñata, an impact sensor affixed to the to the housing, the impact sensor configured to sense an impact to the piñata, and to communicate an impact signal, a controller module affixed to the housing, the controller module including a memory module, a communication module, and a processor module, the memory module configured to persistently store a plurality of piñata communications, the processor module configured to receive the impact signal from the impact sensor, to select at least one of the plurality of piñata communications from the memory module, and to command the speaker to emit at least one of the plurality of piñata communications in response to receiving the impact signal, and a user interface configured to communicate with the communication module and to operate the electronic device by a user;

attaching the electronic device to the piñata such that a portion of the electronic device is within the interior cavity of the piñata and another portion of the electronic device is outside the interior cavity and extends beyond the exterior of the piñata; and communicating a plurality of piñata communications via the speaker in response to the piñata being hit, wherein the user interface is further configured to customize at least one of the plurality of piñata communications, and to store at least one custom piñata communication in the memory module of the controller module, wherein the user interface includes an on/off switch affixed to the housing, and a digital interface integrated with a downloadable application for a user device remote from the from the housing, said digital interface communicably coupleable to the communication module of the controller module.

18. The method of claim 17, further comprising the steps of:

personalizing at least one piñata communication of the electronic device;

communicating the at least one personalized piñata communication via the speaker in response to the piñata being hit;

selecting a mode of operation of the electronic device that is indirectly related to the piñata being hit; and communicating at least one indirect piñata communication via the speaker, the at least one indirect piñata communication selected from an instruction on use or history of piñatas, an announcement to begin hitting the piñata, an announcement for a specific hitter's turn to begin, an announcement for the specific hitter's turn to end.

* * * * *